(12) United States Patent
Elia et al.

(10) Patent No.: US 9,428,944 B1
(45) Date of Patent: Aug. 30, 2016

(54) ARTICULATING CLOSURE MECHANISM FOR NON-ALIGNED CLOSURE PANELS

(71) Applicant: FORD GLOBAL TECHNOLOGIES, LLC, Dearborn, MI (US)

(72) Inventors: Paul Elia, West Bloomfield, MI (US); Donald P. Iacovoni, Plymouth, MI (US); Paul L. Heirtzler, Northville, MI (US); Henry W. Hausler, Manchester, MI (US); John Patrick Doyle, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/740,910

(22) Filed: Jun. 16, 2015

(51) Int. Cl.
*B62D 25/12* (2006.01)
*B60J 5/10* (2006.01)
*E05B 83/18* (2014.01)
*E05B 83/24* (2014.01)
*E05C 19/02* (2006.01)

(52) U.S. Cl.
CPC ............... *E05B 83/18* (2013.01); *B60J 5/107* (2013.01); *B62D 25/12* (2013.01); *E05B 83/247* (2013.01); *E05C 19/024* (2013.01)

(58) Field of Classification Search
CPC .... B62D 25/10; B62D 25/12; B62D 25/105; B60J 5/104
USPC ............. 296/56, 76, 106, 146.8; 292/341.15, 292/341.16, 341.17, 341.18, 201, 302, 292/DIG. 23, DIG. 43
See application file for complete search history.

(56) References Cited

U.S. PATENT DOCUMENTS

| 2,903,288 | A | * | 9/1959 | Joachim | ................... | E05B 81/22 |
| | | | | | | 292/341.16 |
| 3,572,065 | A | * | 3/1971 | Peters | ..................... | E05B 81/22 |
| | | | | | | 292/201 |
| 3,716,945 | A | * | 2/1973 | Cooper | .................... | B60J 5/106 |
| | | | | | | 296/56 |
| 4,413,854 | A | * | 11/1983 | Hirshberg | ................ | B60J 5/101 |
| | | | | | | 296/146.8 |
| 4,688,844 | A | * | 8/1987 | Hirose | ...................... | B60J 5/101 |
| | | | | | | 296/106 |
| 4,707,007 | A | * | 11/1987 | Inoh | ........................ | E05B 81/22 |
| | | | | | | 292/216 |
| 5,531,498 | A | * | 7/1996 | Kowall | ................... | E05B 81/22 |
| | | | | | | 296/146.4 |
| 5,765,886 | A | * | 6/1998 | Buchanan, Jr. | ......... | E05B 81/22 |
| | | | | | | 292/341.16 |
| 6,007,139 | A | * | 12/1999 | Shave | ...................... | B60J 5/101 |
| | | | | | | 296/146.8 |
| 6,174,015 | B1 | * | 1/2001 | Shave | ...................... | B60J 5/101 |
| | | | | | | 296/55 |
| 6,234,564 | B1 | * | 5/2001 | Kim | ....................... | B60J 1/1884 |
| | | | | | | 296/146.8 |
| 6,318,782 | B1 | * | 11/2001 | Suzuki | ..................... | B60J 5/106 |
| | | | | | | 296/106 |
| 6,418,667 | B1 | * | 7/2002 | Moon | ..................... | B60J 5/101 |
| | | | | | | 16/DIG. 17 |
| 6,669,247 | B2 | * | 12/2003 | Swan | ..................... | E05B 81/14 |
| | | | | | | 292/201 |
| 8,596,706 | B2 | | 12/2013 | McGuire et al. | | |
| 8,998,278 | B2 | * | 4/2015 | Wilde | ..................... | E05B 79/20 |
| | | | | | | 292/144 |
| 9,067,626 | B1 | * | 6/2015 | Anderson | ............. | B62D 25/12 |
| 2002/0030366 | A1 | * | 3/2002 | Swan | ..................... | E05B 81/14 |
| | | | | | | 292/201 |

* cited by examiner

*Primary Examiner* — Dennis H Pedder
(74) *Attorney, Agent, or Firm* — Jason Rogers; King & Schickli, PLLC

(57) ABSTRACT

A liftgate/decklid assembly for a motor vehicle includes a liftgate panel hingedly connected to the vehicle to define a liftgate swing arc. A decklid panel is hingedly connected to the liftgate panel to define a decklid swing arc. The decklid and liftgate panels are not aligned, causing the decklid swing arc to be different from the liftgate swing arc. The assembly further includes a liftgate/decklid assembly closure mechanism including an articulating member configured for translating a portion of the closure mechanism between an orientation normal to the liftgate swing arc and an orientation normal to the decklid swing arc.

20 Claims, 9 Drawing Sheets

ARTICULATING CLOSURE MECHANISM FOR NON-ALIGNED CLOSURE PANELS

TECHNICAL FIELD

This document relates generally to the motor vehicle field and, more particularly, to closures and closure systems for non-aligned closure panels of vehicles.

BACKGROUND

It is known to provide dual-closure panel systems, for example dual rear closure systems including two hinged panels such as a combined rear decklid and liftgate system including a liftgate hinged to the vehicle and a decklid hinged to the liftgate. An example is representatively shown in FIGS. 1A and 1B, depicting a vehicle V including a combined decklid D and liftgate L assembly. Such dual closure systems provide convenience to the user, allowing the user to at her option utilize the rear closure as a hatchback lid or as a conventional trunk lid. This provides flexibility and adaptability in using/accessing the vehicle rear cargo area.

However, conventional dual-closure panel systems present engineering problems because the two hinged panels are not aligned one to another and do not pivot at identical angles during a closing operation. That is, because of the different orientations at which the two panels are held relative to a vehicle longitudinal axis, as is known a deck lid will pivot to mate with a latch at a first approach angle, whereas a liftgate will pivot to mate with the latch at a second approach angle that is different from the first approach angle.

To solve this problem, manufacturers have considered various solutions, including dual latching systems wherein the rear liftgate and rear decklid include separate frame elements and wherein separate dedicated closures/latching mechanisms are provided for the rear decklid and rear liftgate. This solution, while potentially effective, introduces undesirable weight, complexity, and cost to the manufacturing process which must be passed on to the consumer. Manufacturers have also provided liftgate/decklid assemblies that, by their orientation one to another, define substantially similar pivoting angles and assume substantially similar approach angles to a latching mechanism. Such liftgate/decklid assemblies are able to utilize a single closure or latching mechanism, but this requires the liftgate and decklid swing arcs to be closely aligned (within +/−3 degrees), which is a conventional latching system's functional 'misalignment" maximum range. This solution, while also potentially effective, significantly constrains vehicle styling options, and further requires a mechanism to prevent the decklid from independently pivoting while opening the liftgate. Again, undesirable complexity and cost are introduced in the manufacturing process which must be passed on to the consumer.

To address these and other problems, the present disclosure describes an articulating closure for non-aligned closure panels such as a combined rear decklid and liftgate. Advantageously, by the presently described articulating closure system a single latch can accommodate both closure panels without requiring alignment of the panels to provide a similar approach angle to the latch.

SUMMARY

In accordance with the purposes and benefits described herein, in one aspect a closure mechanism for a liftgate/decklid assembly of a motor vehicle is described, comprising an articulating member configured for translating a portion of the closure mechanism between a first orientation normal to a decklid swing arc and a second orientation normal to a liftgate swing arc. The decklid swing arc may define a radius that is different from a radius defined by the liftgate swing arc. In an embodiment, the articulating member is a striker assembly and the first orientation positions a striker latch-engaging surface normal to the decklid swing arc and the second orientation positions the striker latch-engaging surface normal to the liftgate swing arc. An actuator may be provided, operatively connected to the striker assembly to bias the striker between the first orientation and the second orientation.

In embodiments, the striker assembly includes a mounting bracket providing one or more guide slots for guiding the striker between the first and the second orientation. The striker includes one or more guide pins for engaging the one or more guide slots.

In another embodiment, the striker assembly includes one or more drive links operatively connecting the actuator and the striker assembly. At least one of the one or more drive links may pivot about a fixed pivot point to bias the striker between the first and the second orientation. In an alternative embodiment, at least one of the one or more drive links may bias the striker about a fixed pivot point to translate the striker between the first and the second orientation.

In another aspect, a liftgate/decklid assembly for a motor vehicle is described including a liftgate panel hingedly connected to the vehicle and a decklid panel hingedly connected to the liftgate panel. Because the liftgate panel and decklid panel are not aligned, the decklid swing arc defines a radius that is different from a radius defined by the liftgate swing arc. The liftgate/decklid assembly includes a closure mechanism having an articulating member as described above. As before, the articulating member may be a striker assembly. The described first orientation positions a striker latch-engaging surface normal to the decklid swing arc, and the described second orientation positions the striker latch-engaging surface normal to the liftgate swing arc.

In the following description, there are shown and described several preferred embodiments of the disclosed articulating closure for non-aligned closure panels. As it should be realized, the devices are capable of other, different embodiments and their several details are capable of modification in various, obvious aspects all without departing from the descriptions set forth herein and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the disclosed articulating closure for non-aligned closure panels and together with the description serve to explain certain principles thereof. In the drawing figures.

Figure 2:
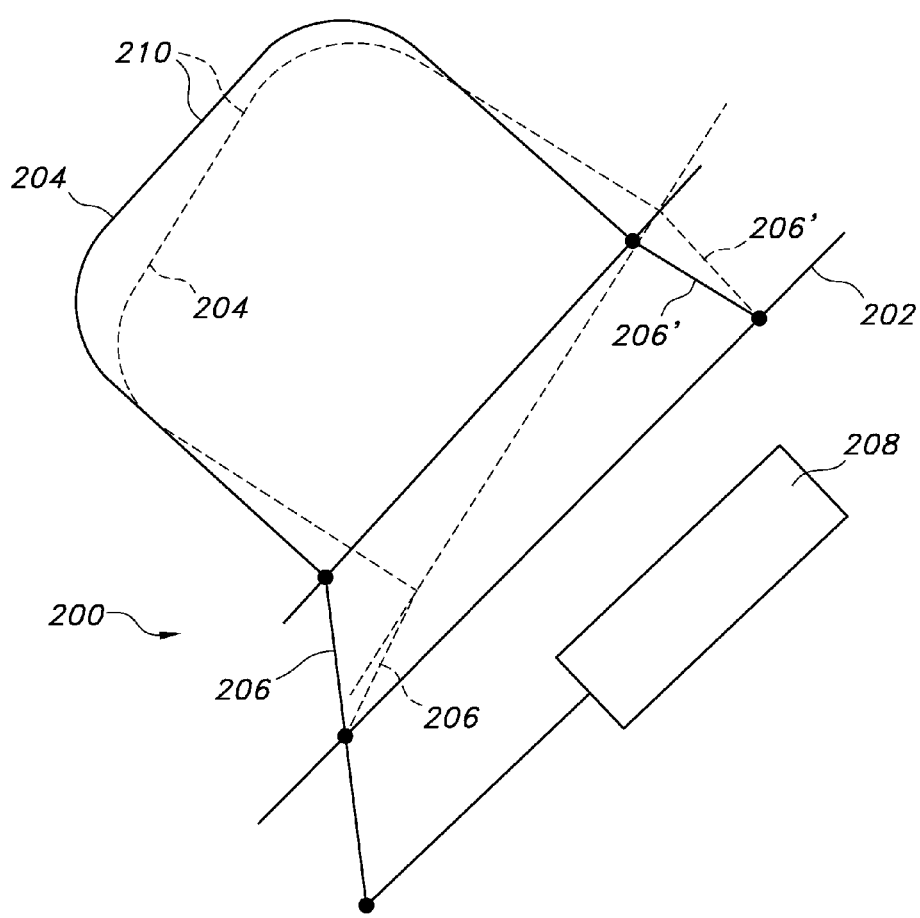
Figure 3A:
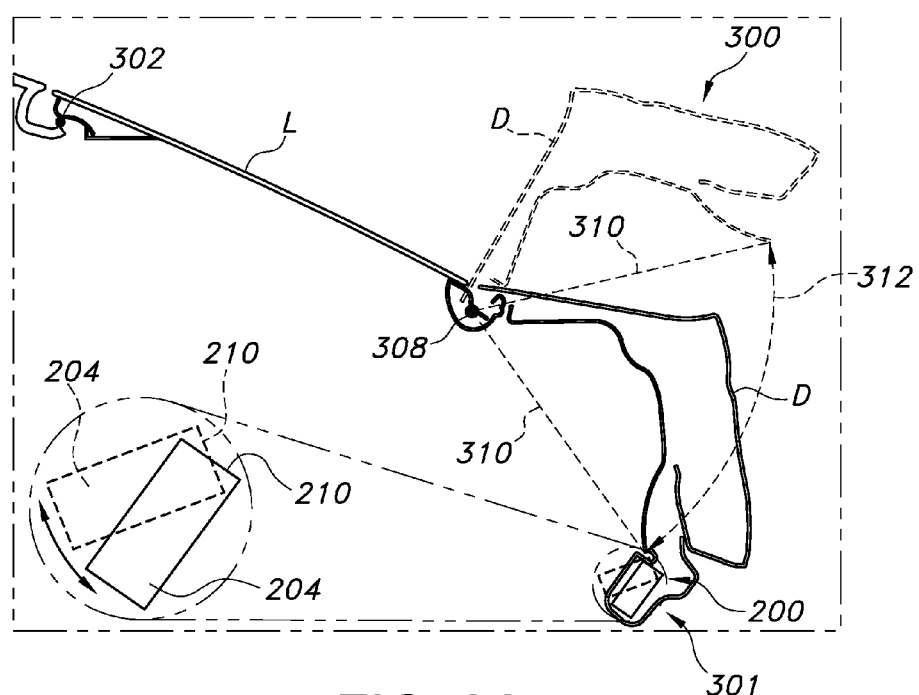
Figure 3B:
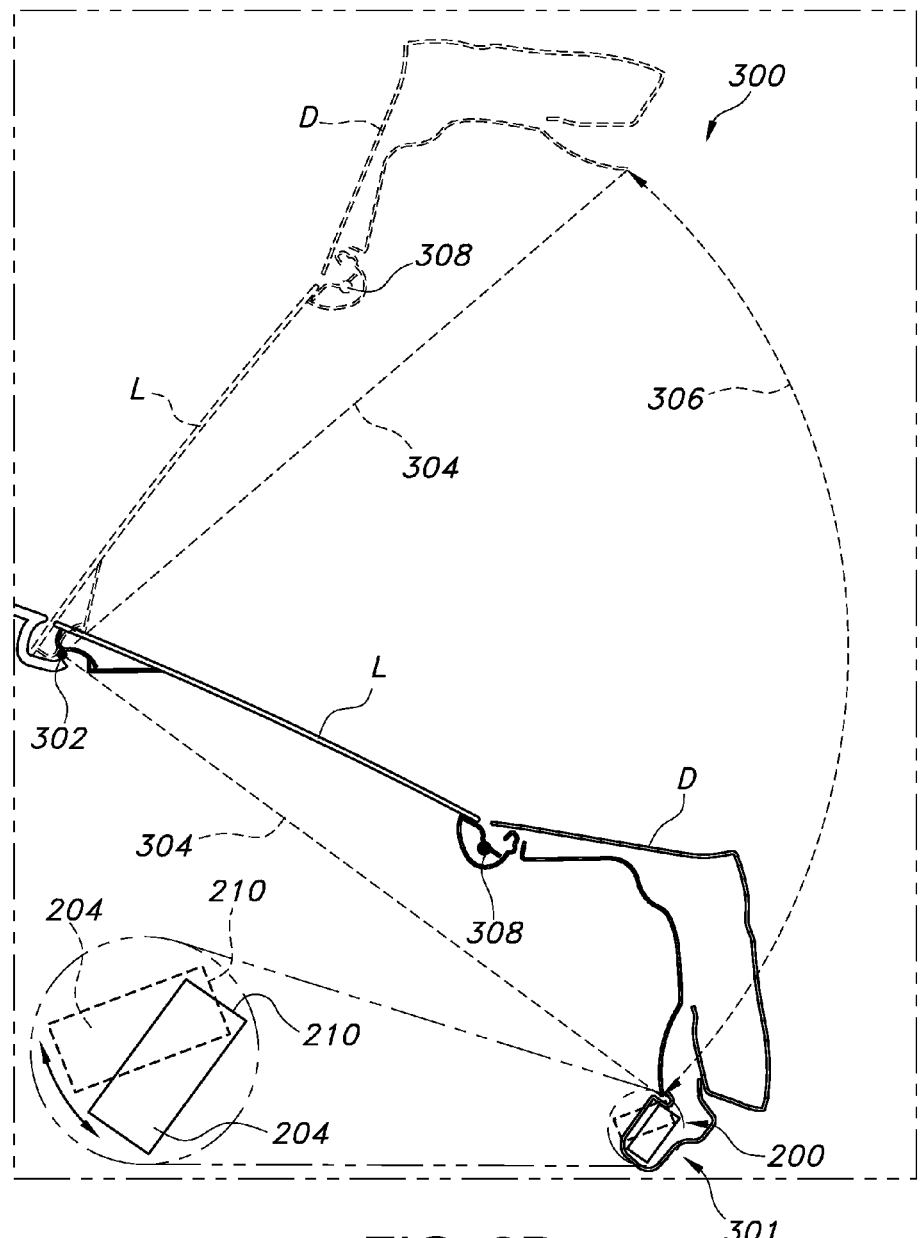
Figure 4:
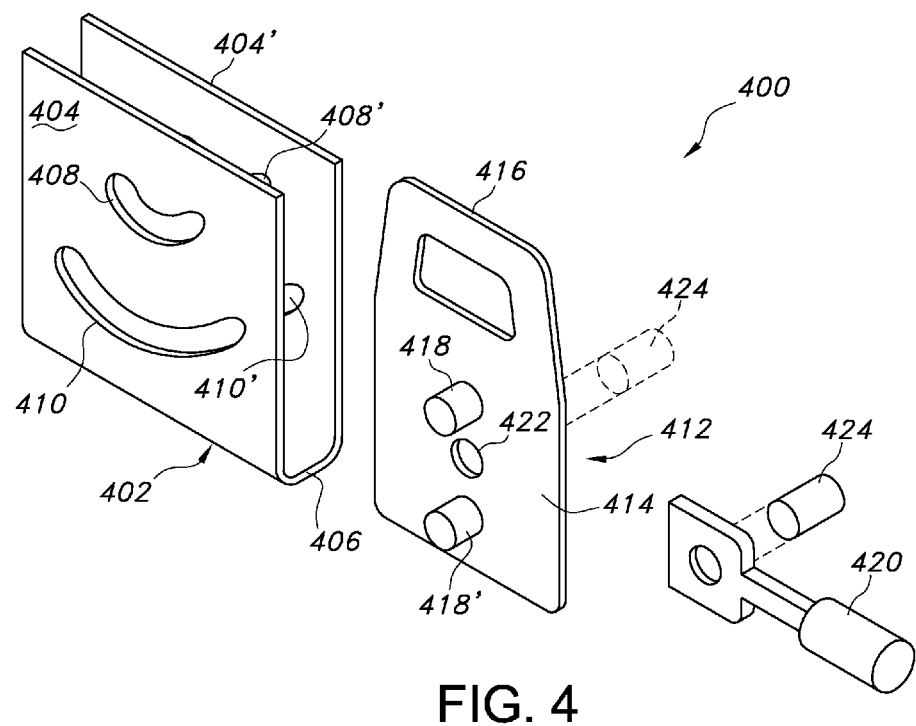
Figure 5:
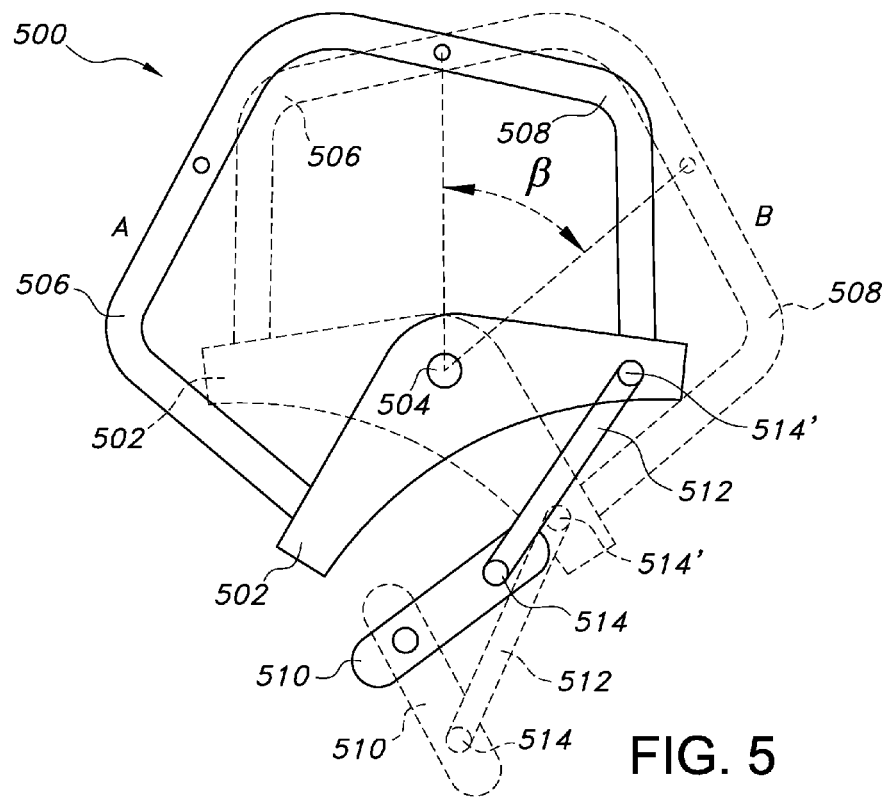
Figure 6:
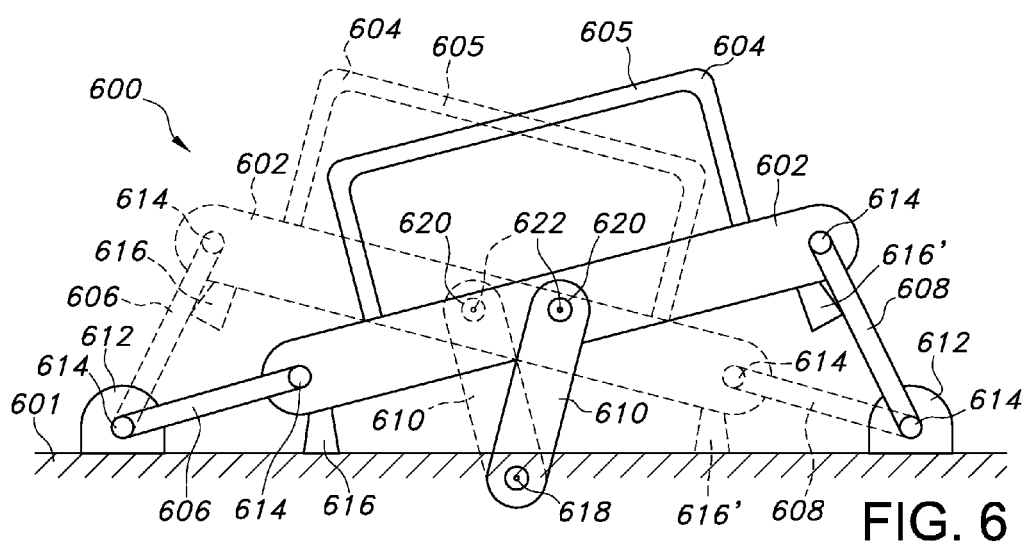
Figure 7A:
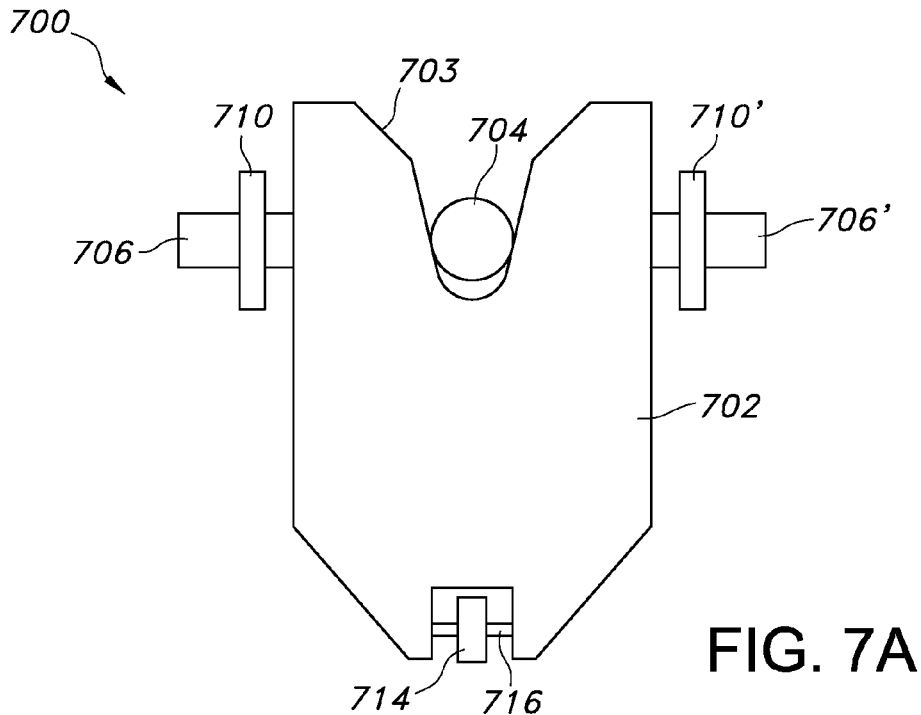
Figure 7B:
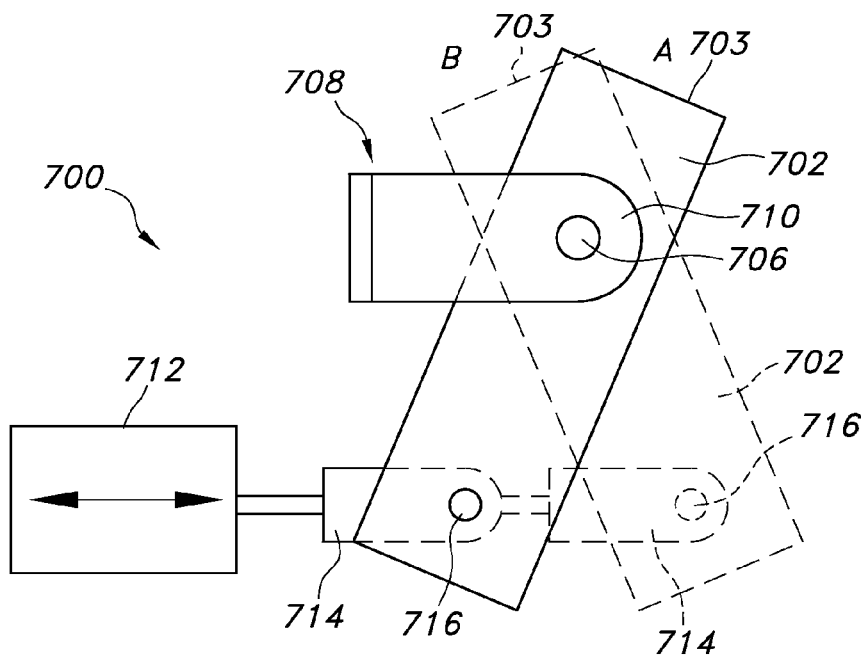
Figure 8A:
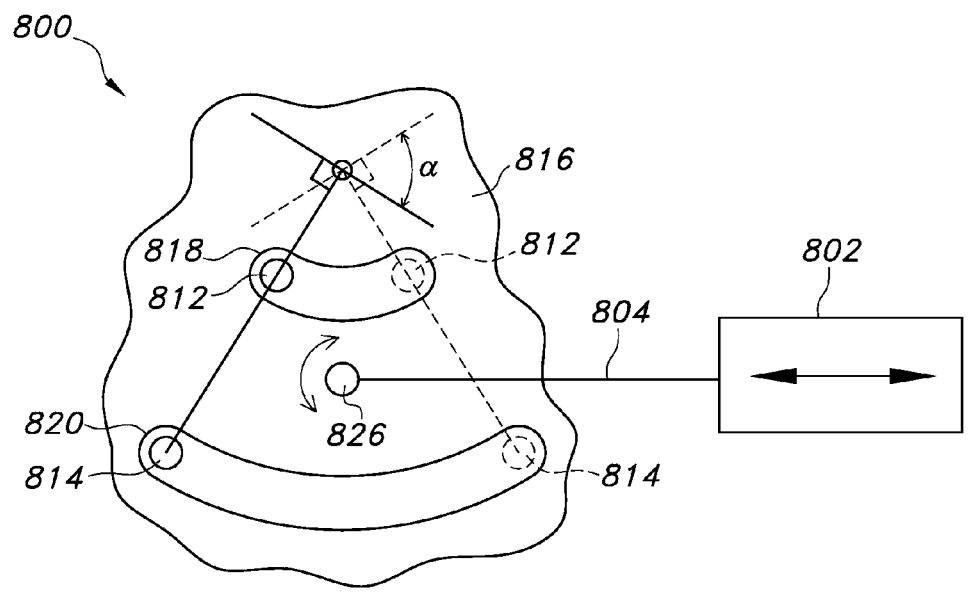
Figure 8B:
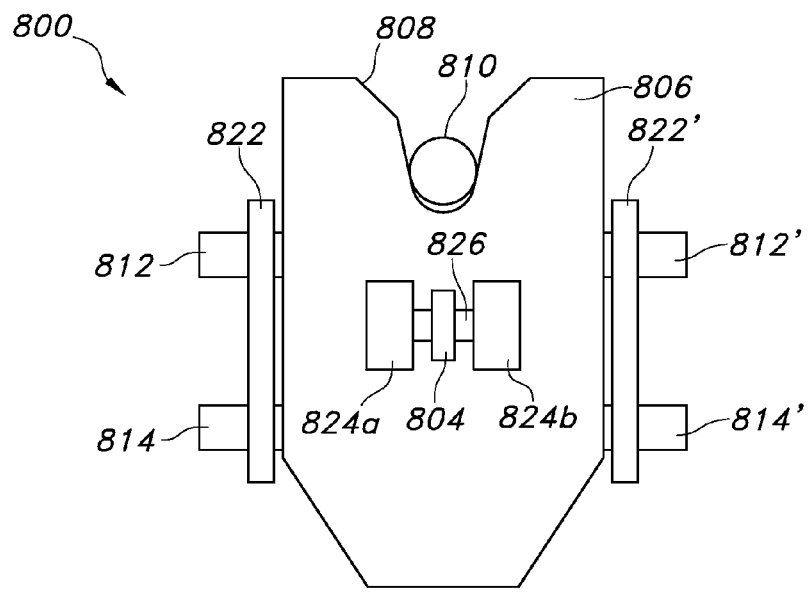
Figure 8C:
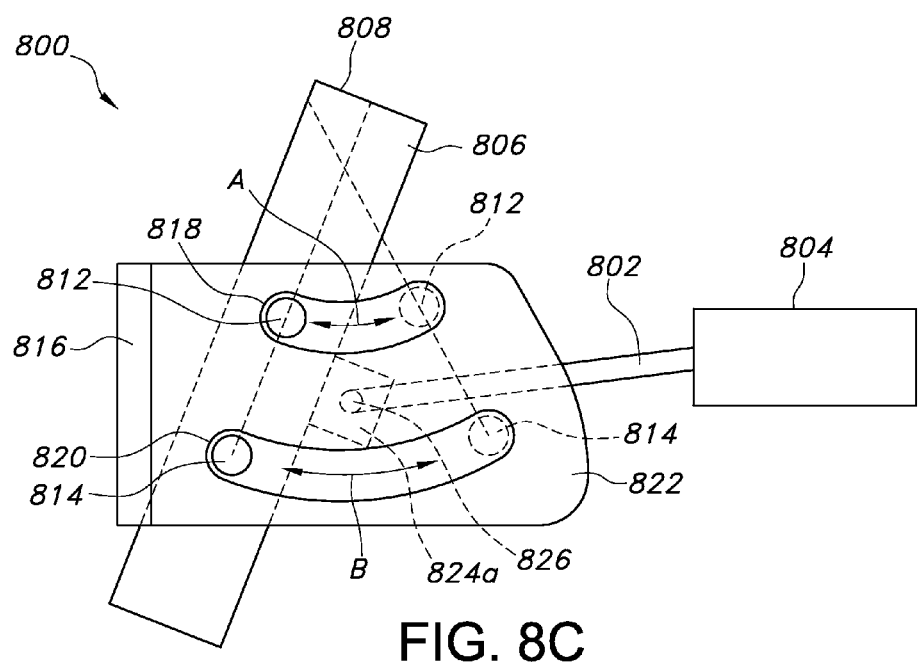

FIG. 2 schematically depicts an articulating striker for a combined liftgate/decklid;

FIG. 3A depicts operation of a decklid of a combined liftgate/decklid using the articulating striker of FIG. 2;

FIG. 3B depicts operation of a liftgate of a combined liftgate/decklid using the articulating striker of FIG. 2;

FIG. 4 shows an embodiment of the articulating striker of FIG. 2;

FIG. 5 shows an alternative embodiment of the articulating striker of FIG. 2;

FIG. 6 shows another embodiment of the articulating striker of FIG. 2;

FIG. 7A depicts an embodiment of an articulating latch for a combined liftgate/decklid;

FIG. 7B depicts a side view of the articulating latch of FIG. 7A;

FIG. 8A schematically depicts an alternative embodiment of an articulating latch for a combined liftgate/decklid;

FIG. 8B depicts a front view of the articulating latch of FIG. 8A;

FIG. 8C depicts a side view of the articulating latch of FIG. 8a; and

Figure 9:
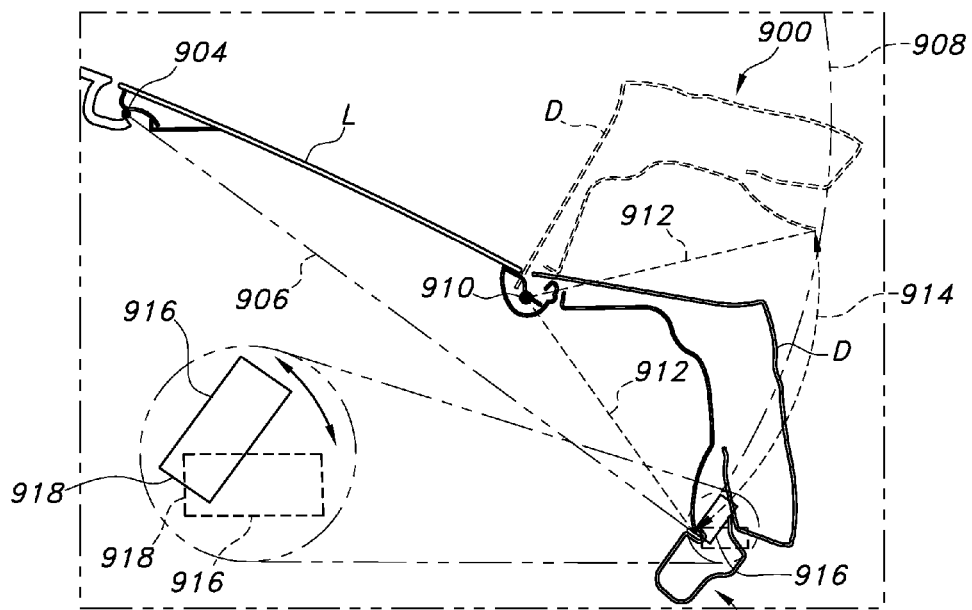

FIG. 9 depicts operation of a combined liftgate/decklid using the articulating latch of FIG. 8A.

Reference will now be made in detail to the present preferred embodiments of the described articulating closure for non-aligned closure panels, examples of which are illustrated in the accompanying drawing figures.

DETAILED DESCRIPTION

Figure 1A:
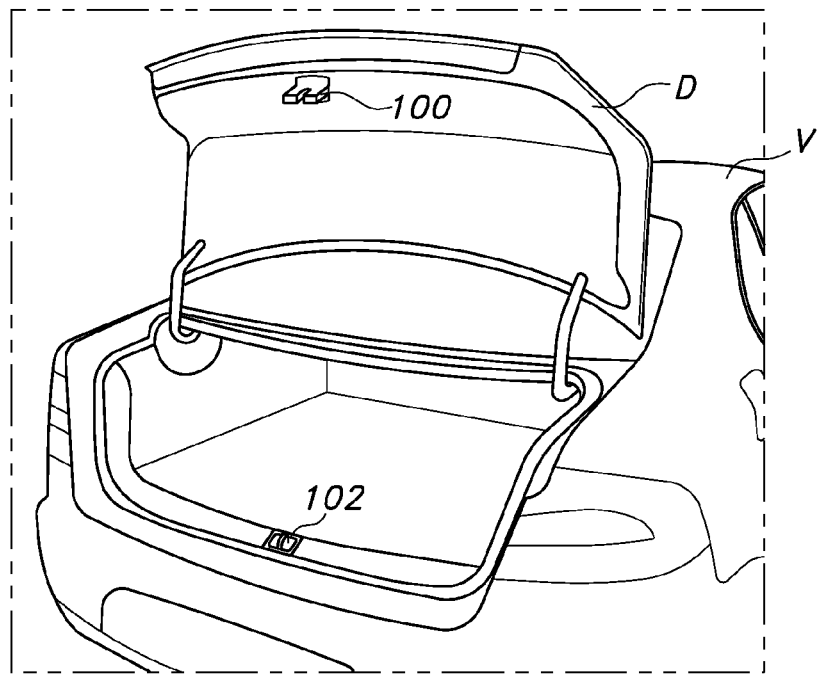
FIG. 1A illustrates a rear combined liftgate/decklid for a vehicle with the decklid in an open configuration.
Figure 1B:
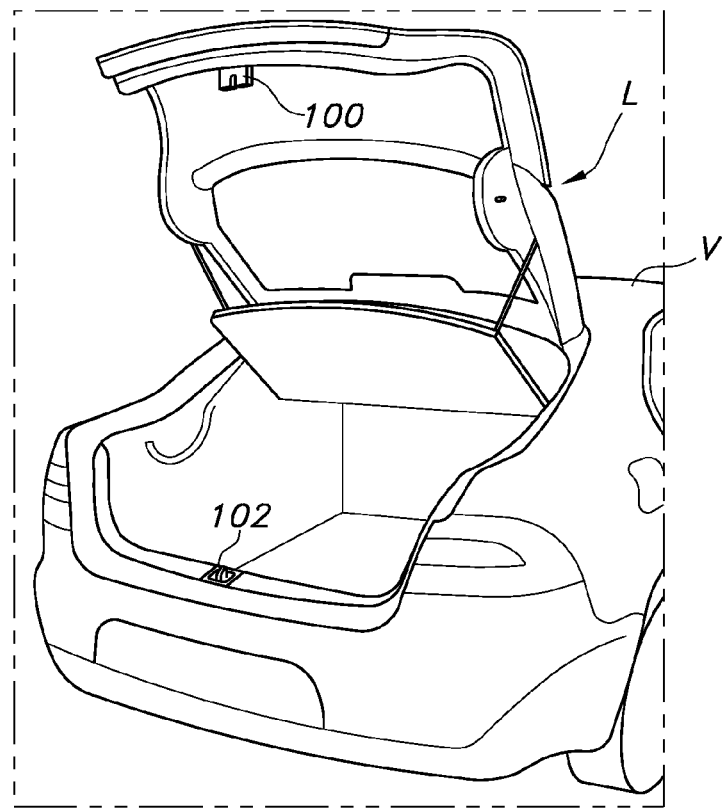
FIG. 1B illustrates a rear combined liftgate/decklid for a vehicle with the liftgate in an open configuration.

To solve the above-summarized and other problems, at a high level the present disclosure describes an articulating closure for non-aligned closure panels such as the combined liftgate/decklid panels depicted in FIGS. 1A-B. As described above, such combined liftgate/decklid panels typically include a liftgate panel L hingedly attached to a vehicle V, and a decklid panel D hingedly attached to the liftgate panel L. as depicted, decklid panel D includes a latch assembly 100 for capturing a striker assembly 102 associated with the vehicle V.

With reference to FIG. 2, in one embodiment the articulating closure provides an articulating striker assembly 200. The articulating striker assembly 200 includes a mounting base 202, a striker 204, and pivoting links 206, 206' configured to allow pivoting of the striker 204 relative to the mounting base 202. An actuator 208 provides the desired articulating/pivoting motion of the striker 204. Of course, actuator 208 could be operated by the user by way of any number of mechanisms (not shown), including without intending any limitation buttons or switches associated with the vehicle dash panel/instrument cluster, buttons or switches associated with an information center associated with the vehicle dash panel or a vehicle console, buttons/switches associated with the actual vehicle liftgate/decklid assembly or a rear portion of the vehicle, buttons/switches associated with a user key fob or smartkey, and combinations thereof.

As depicted in the drawing figure, striker 204 is a loop-type striker including a latch-engaging surface 210. However, the depicted assembly equally is adaptable to other striker 204 types such as post-type strikers, and so the drawing will not be taken as limiting. Likewise, any suitable actuator 208 is contemplated, including linear actuators, mechanical actuators, electrical actuators, solenoid actuators, cams, and others.

As shown in FIG. 2, by the action of actuator 208, striker 204 is articulated to translate the latch-engaging surface 210 between two positions (see broken lines), thus maintaining the latch-engaging surface 210 in the proper orientation to provide a desired approach angle to a latch (not shown in this view) in accordance with whether the liftgate panel L or the decklid panel D are closed. Thus, a "decklid mode" and a "liftgate mode" are provided for the described closure.

This is illustrated in FIGS. 3A-3B, showing a liftgate/decklid assembly 300 and an articulating striker assembly 301 according to the present disclosure in operation. For representative purposes, the striker assembly 200 of FIG. 2 is depicted, although as will be described infra alternative striker assembly configurations are contemplated. Liftgate panel L is hingedly attached to a vehicle (not shown in this view) by a hinge assembly 302, and by its orientation relative to the vehicle (depicted with broken line 304 in FIG. 3B) provides a liftgate swing arc 306. In turn, decklid panel D is hingedly attached to liftgate panel L by a hinge assembly 308, and by its orientation relative to the vehicle (depicted with broken line 310 in FIG. 3B) provides a decklid swing arc 312 that is different from liftgate swing arc 306 (note that broken lines 304 and 310 representing the orientations of decklid panel D and liftgate panel L are not aligned). Thus, as will be appreciated, liftgate panel L and decklid panel D approach articulating striker assembly 301 at different approach angles. However, by the articulation of articulating striker assembly 200, the different approach angles of liftgate panel L and decklid panel D can be conveniently accommodated by a single articulating striker assembly 301 which repositions to provide a striker orientation presenting a latch contact surface 210 that is normal to one of the liftgate panel L swing arc 306 or the decklid panel D swing arc 312 and the respective approach angles of the two panels.

A number of alternative configurations for an articulating closure including an articulating striker are contemplated. For example, in one embodiment depicted in FIG. 4, an articulating striker assembly 400 is shown including a fixed base plate 402. In the depicted embodiment, base plate 402 includes opposed walls 404, 404' and a bottom 406 defining a substantially U-shaped base. Walls 404, 404' include at least one aligned articulation slot. In the depicted embodiment, each wall 404, 404' includes a pair of arcuate guide slots 408, 410, 408', 410'.

A pivoting striker 412 is provided, having a body 414 including a latch-engaging surface 416. Body 414 further includes guide pins 418, 418' configured for slidingly engaging arcuate slots 408, 410, 408', 410'. As will be appreciated, guide pins 418, 418' extend from both sides of body 414 to engage the articulations slots in each of base plate opposed walls 404, 404'. As shown, guide slots 408, 408' define a lesser length dimension than guide slots 410, 410', and so a lower end of striker body 414 can be translated a greater distance than the corresponding opposed upper end of striker body 414. By this feature, latch-engaging surface 416 is pivoted over an included angle α as will be described.

Body 414 is further configured to operatively connect striker 412 to an actuator 420, in the depicted embodiment being a linear actuator 420. In the depicted embodiment, body 414 includes an aperture 422 configured to receive a wrist pin 424 which operatively connects the actuator 420 to the striker 412. As will be appreciated, by the operation of actuator 412, pins 418, 418' are laterally translated within arcuate slots 408, 410, 408', 410', altering an orientation angle of latch-engaging surface 416 in accordance with whether closure of a decklid panel D or a liftgate panel L is desired.

In another embodiment (see FIG. 5) an articulating striker assembly 500 is shown, configured for pivoting about a common pivot point. As shown in the drawing, striker assembly 500 includes a pivoting base 502 configured for pivoting about a pivot point, which may be provided by a pin 504. A striker 506 including a latch-engaging surface 508 is associated with pivoting base 502, such as by attaching. Of course, striker 506 may be formed as an integral part of pivoting base 502. A drive link 510 is operatively attached to an end of pivoting base 502, such as by actuator arm 512 and pins 514, 514'.

In operation, drive link 510 is operatively connected to an actuator (not shown in this view), and causes pivoting base 502 to pivot over an included angle β between a first orientation A providing a "decklid mode" suitable for engaging a latch (not shown) associated with a decklid panel D of a non-aligned liftgate/decklid (not shown) and a second orientation B suitable for engaging a latch (not shown) associated with a liftgate panel L (not shown) of the non-aligned liftgate/decklid.

In yet another embodiment (see FIG. 6) an articulating striker assembly 600 is shown supported on a base 601 which may be a separate base or simply a portion of a vehicle V (not shown). Striker assembly 600 includes a striker base 602 and a striker 604 configured for articulating to alter an orientation of a latch-engaging surface 605. A four bar linkage defined by paired links 606, 606', 608, 608' (links 606', 608' not visible in this view), in combination with a pivoting drive link 610, provide the desired articulation of the striker assembly 600. Links 606, 606', 608, 608' are pivotally attached at a first end to striker base 602 and pivotally attached at a second end to base 601, such as by lugs 612. The pivotal attachment can be accomplished by any suitable means such as by pins 614. Stops 616, 616' restrict pivoting movement of striker base 602 to a desired range of motion.

Drive link 610 is pivotally attached at a first end to a fixed position on base 601, such as by a pin 618. Drive link 610 is operatively attached at an opposed end to striker base 602, such as by a slot 620 engaging a striker base pin 622 as shown. Thus, pivoting of drive link 610, such as by operation of a mechanical or electrical actuator (not shown), causes striker 604 of striker assembly 600 to pivot and latch-engaging surface 605 to translate between a first and a second orientation, thus providing a "decklid mode" and "liftgate mode" as described above.

As will be appreciated, by the foregoing a simple, efficient, and robust articulating closure for a combined liftgate/decklid assembly wherein the liftgate and decklid panels are not aligned is described. The described assemblies are relatively un-complex and simple to operate, and allow a single closure system adapted for securing such non-aligned liftgate/decklid assemblies regardless of whether it is the liftgate panel or the decklid panel that is being closed, by providing a striker that can be oriented normally to either the liftgate swing arc or the decklid swing arc as desired, i.e. to pivot to provide a substantially 90° alignment to both the liftgate panel and the decklid panel.

The foregoing has been presented for purposes of illustration and description. It is not intended to be exhaustive or to limit the embodiments to the precise form disclosed. Obvious modifications and variations are possible in light of the above teachings. For example, the foregoing description is directed to various embodiments of an articulating closure assembly including a fixed-angle latch and an articulating striker which can be differently oriented to accommodate differing approach angles of a liftgate panel or a decklid panel of a liftgate/decklid assembly. However, it is equally contemplated to provide an articulating closure assembly including a fixed-angle striker and an articulating latch, wherein it is the latch that can be differently oriented to accommodate differing approach angles of the liftgate panel and/or the decklid panel.

As non-limiting examples, FIGS. 7A and 7B show an embodiment of a pivoting latch mechanism 700 including a latch 702 having a latch face 703 configured for capturing a striker 704. Latch 702 includes opposed pivot pins 706, 706' configured for engaging a mounting bracket 708 (see FIG. 7B) attached to a vehicle V (not shown), such as by mounting bracket arms 710, 710'. Latch 702 is further operatively and pivotally attached to an actuator 712, in the depicted embodiment to an actuator arm 714 engaging a pivot pin 716. Thus, operation of actuator 712 (see arrow) biases latch 702 between a first orientation A and a second orientation B, providing a "decklid mode" and a "liftgate mode" substantially as described above.

In another embodiment (see FIGS. 8A-8C), a sliding latch mechanism 800 is provided adapted for biasing (by an actuator 802/actuator arm 804) to pivot a striker-engaging surface of a latch over an included angle α to dispose the latch normally to one or the other of a decklid and a liftgate swing arc. With reference to FIG. 8B, a latch 806 includes a latch face 808 configured to capture a striker 810. Opposed pins 812, 814, 812', 814' engage a mounting bracket 816 (see FIGS. 8A and 8C), such as by arcuate guide slots 818, 820, 818', and 820' disposed in opposed arms 822, 822' (slots 818' and 820' not visible in the depicted views).

With reference to FIGS. 8B and 8C, actuator 802 is operatively connected to latch 806, such as by an actuator arm 804 pivotally connected to lugs 824a, 824b by a pin 824. By operation of actuator 804, latch 806 is slidingly translated along a length dimension of arcuate guide slots 812a, 812b, 812c, 812d. As shown, guide slots 818 and 818' define a lesser length dimension than guide slots 820, 820', and so a lower end of latch 806 can be translated a greater distance than the corresponding opposed upper end of latch 806 (see arrows A, B). By this feature, latch face 808 is pivoted over included angle α as shown.

This is illustrated in FIG. 9, showing a liftgate/decklid assembly 900 having a liftgate panel L, a decklid panel D, and a closure assembly 902 including an articulating latch as described above associated with the decklid panel D and a fixed angle striker associated with vehicle V (not shown). Liftgate panel L is hingedly attached to a vehicle (not shown in this view) by a hinge assembly 904, and by its orientation relative to the vehicle (depicted with broken line 906) provides a liftgate swing arc 908. In turn, decklid panel D is hingedly attached to liftgate panel L by a hinge assembly 910, and by its orientation relative to the vehicle (depicted with broken line 912) provides a decklid panel swing arc 914 that is different from liftgate panel swing arc 908 (note that broken lines 9064 and 912 representing the orientations of decklid panel D and liftgate panel L are not aligned). Thus, as will be appreciated, liftgate panel L and decklid panel D approach closure 902 and the fixed striker at different approach angles. However, by the articulation of articulating latch 916 as described above, the different approach angles of liftgate panel L and decklid panel D can be conveniently accommodated by a single closure 902 by pivoting latch face 918 as described and shown to present a striker engaging face 918 that is normal to one of the liftgate panel L swing arc 908 or the decklid panel D swing arc 914 and the respective approach angles of the two panels.

Thus, an alternative single closure system is provided, adapted for securing non-aligned liftgate/decklid assemblies regardless of whether it is the liftgate or the decklid that is being closed. The closure system includes a latch that can be oriented normally to either the liftgate swing arc or the decklid swing arc as desired, i.e. to pivot to provide a substantially 90° alignment to both the liftgate and the decklid.

All such modifications and variations are within the scope of the appended claims when interpreted in accordance with the breadth to which they are fairly, legally and equitably entitled.

What is claimed:

1. A closure mechanism for a liftgate/decklid assembly of a motor vehicle, comprising an articulating member configured for translating a portion of the closure mechanism between a first orientation normal to a decklid swing arc and a second orientation normal to a liftgate swing arc.

2. The mechanism of claim 1, wherein the decklid swing arc defines a radius that is different from a radius defined by the liftgate swing arc.

3. The mechanism of claim 2, wherein the articulating member is a striker assembly and the first orientation positions a striker latch-engaging surface normal to the decklid swing arc and the second orientation positions the striker latch-engaging surface normal to the liftgate swing arc.

4. The mechanism of claim 3, further including an actuator operatively connected to the striker assembly to bias the striker between the first orientation and the second orientation.

5. The mechanism of claim 4, including a mounting bracket providing one or more guide slots for guiding the striker between the first and the second orientation.

6. The mechanism of claim 5, wherein the striker includes one or more guide pins for engaging the one or more guide slots.

7. The mechanism of claim 4, further including one or more drive links operatively connecting the actuator and the striker assembly.

8. The mechanism of claim 7, wherein at least one of the one or more drive links pivots about a fixed pivot point to bias the striker between the first and the second orientation.

9. The mechanism of claim 7, wherein at least one of the one or more drive links biases the striker about a fixed pivot point to translate the striker between the first and the second orientation.

10. A vehicle including the mechanism of claim 1.

11. A liftgate/decklid assembly for a motor vehicle, comprising:
    a liftgate panel hingedly connected to the vehicle;
    a decklid panel hingedly connected to the liftgate panel; and
    a closure mechanism comprising an articulating member configured for translating a portion of the closure mechanism between a first orientation normal to a decklid swing arc and a second orientation normal to a liftgate swing arc.

12. The assembly of claim 11, wherein the decklid swing arc defines a radius that is different from a radius defined by the liftgate swing arc.

13. The assembly of claim 12, wherein the articulating member is a striker assembly and the first orientation positions a striker latch-engaging surface normal to the decklid swing arc and the second orientation positions the striker latch-engaging surface normal to the liftgate swing arc.

14. The assembly of claim 13, further including an actuator operatively connected to the striker assembly to bias the striker between the first orientation and the second orientation.

15. The assembly of claim 14, including a mounting bracket providing one or more guide slots for guiding the striker between the first and the second orientation.

16. The assembly of claim 15, wherein the striker includes one or more guide pins for engaging the one or more guide slots.

17. The assembly of claim 14, further including one or more drive links operatively connecting the actuator and the striker assembly.

18. The assembly of claim 17, wherein at least one of the one or more drive links pivots about a fixed pivot point to bias the striker between the first and the second orientation.

19. The assembly of claim 17, wherein at least one of the one or more drive links biases the striker about a fixed pivot point to translate the striker between the first and the second orientation.

20. A vehicle including the assembly of claim 11.

* * * * *